(12) United States Patent
Steinbach

(10) Patent No.: US 7,206,341 B2
(45) Date of Patent: Apr. 17, 2007

(54) SYSTEM AND METHOD FOR PROVIDING EQUALIZATION IN A MULTIPHASE COMMUNICATIONS RECEIVER

(75) Inventor: Gunter W. Steinbach, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 711 days.

(21) Appl. No.: 10/021,784

(22) Filed: Dec. 11, 2001

(65) Prior Publication Data

US 2003/0108096 A1    Jun. 12, 2003

(51) Int. Cl.
*H03H 7/30*    (2006.01)
*H03H 7/40*    (2006.01)
*H03K 5/159*   (2006.01)

(52) U.S. Cl. .................... 375/229; 333/18; 333/28; 708/300; 708/819

(58) Field of Classification Search ............ 375/257, 375/285, 317, 319, 346, 349, 229; 327/124; 333/18, 28; 708/300, 819
See application file for complete search history.

(56) References Cited

U.S. PATENT DOCUMENTS

| | | | | |
|---|---|---|---|---|
| 4,807,147 A | * | 2/1989 | Halbert et al. ............ 702/66 |
| 5,590,154 A | * | 12/1996 | Forni et al. ............ 375/229 |
| 5,666,170 A | * | 9/1997 | Stewart ............ 348/726 |
| 5,940,442 A | * | 8/1999 | Wong et al. ............ 375/232 |
| 6,047,032 A | * | 4/2000 | Zortea et al. ............ 375/317 |
| 6,473,019 B1 | * | 10/2002 | Ruha et al. ............ 341/143 |
| 6,567,467 B1 | * | 5/2003 | Wu ............ 375/233 |
| 6,707,868 B1 | * | 3/2004 | Camagna et al. ............ 375/371 |
| 6,859,762 B2 | * | 2/2005 | Mawet ............ 702/189 |
| 6,870,882 B1 | * | 3/2005 | Al-Dhahir et al. ............ 375/233 |
| 2003/0123591 A1 | * | 7/2003 | Walker ............ 375/355 |
| 2003/0177438 A1 | * | 9/2003 | Waschura et al. ............ 714/819 |
| 2004/0004945 A1 | * | 1/2004 | Monsen ............ 370/328 |

OTHER PUBLICATIONS

Farjad-Rad, Ramin, A 0.3-um CMOS 8-Gb/s 4-PAM Serial Link Transceiver, IEEE Journal of solid-State Circuits, vol. 35, No. 5, May, 2000, pp. 757-764.

* cited by examiner

*Primary Examiner*—David C. Payne
*Assistant Examiner*—Erin M. File

(57) ABSTRACT

A circuit and method for receiving digital signals are disclosed. The circuit includes an input connected to a communications channel over which a digital signal is communicated and operates a plurality of multiple decision circuits at a frequency that is a fraction of the bit rate of the digital signal. A feedback and/or equalizer circuit receives the output of the decision circuits and applies a feedback signal to the input of the decision circuits that is representative of a combination of output signals of the decision circuits. The result is seen to improve the noise margin for correctly interpreting signals communicated over a communications channel having a low-pass characteristic.

35 Claims, 4 Drawing Sheets

SYSTEM AND METHOD FOR PROVIDING EQUALIZATION IN A MULTIPHASE COMMUNICATIONS RECEIVER

BACKGROUND OF THE INVENTION

1. Technical Field of the Invention

The present invention relates to receivers for communications systems, and particularly to providing equalization to multiphase receivers in communications systems.

2. Description of Related Art

Receivers for handling information transported over a communications link generally fall into any of a number of different categories. In a single-phase communications receiver, a single decision circuit operates at the fill bit rate of the received signal in order to determine the state of each bit therein. Because the demands placed on the bandwidth of full bit rate decision circuits, such decision circuits are very difficult to design and implement, especially for high speed operation.

A multiphase communications receiver utilizes a plurality of decision circuits to determine the state of received signals. As shown in FIG. 1, the decision circuits D of a conventional multiphase communications receiver R sample the received signal at equally spaced phases of a clock signal. Each decision circuit D is adapted to operate at a fraction of the bit rate of the received signal.

Some communications links over which signals are transported, such as cable and/or copper traces disposed on a printed circuit board, exhibit low-pass frequency transfer characteristics. Because these low-pass frequency transfer characteristics may be very pronounced, equalization techniques have been utilized in receivers to prevent or reduce intersymbol interference caused by the pronounced low-pass frequency transfer characteristics.

Equalization, within the context of the present application, refers to optimizing the frequency response of the overall system for minimum intersymbol interference by compensating for an undesirable frequency response of the communication link. Equalization is typically performed by use of a decision feedback circuit for a single-phase receiver, or a filter. Because single-phase receivers operate at the full bit rate of the received signal, decision feedback circuitry for single-phase receivers are also undesirably required to operate at a higher bandwidth. Employment of passive filters, either in single-phase or multiphase receivers, is undesirable because the passive filter further attenuates the transmitted signal that has already been attenuated due to channel loss. The use of active or amplifying filter-type equalizers in multiphase receivers is also undesirable because amplifier circuitry operating at the full bit rate is difficult to achieve using existing technologies.

A prior equalizer is described in the paper entitled "A 0.3 um CMOS 8-Gb/s 4-PAM Serial Link Transceiver" by Ramin Farjad-Rad et al.[1] The equalizer is described as a one-tap half-symbol-spaced FIR filter and is said to sharpen the transition edges of the transmitted signal in the time domain. However, the equalizer is relatively complex and the circuitry therefor may disadvantageously slow the operation of the receiver.

[1] IEEE Journal of Solid State Circuits, vol. 35, no. 5, pp. 757–764 (May, 2000).

Based upon the foregoing, there is a need for a receiver with more effective equalization and, concomitantly, reduced intersymbol interference.

SUMMARY OF THE PRESENT INVENTION

Embodiments of present invention overcome shortcomings in prior receivers and satisfy a significant need for providing a multiphase receiver having improved receiving capabilities. An exemplary multiphase receiver generally applies a feedback signal to the receiver input based upon signals generated by the decision circuits of the receiver.

According to an exemplary embodiment of the present invention, the multiphase receiver includes a plurality of decision circuits. Each decision circuit includes an input connected to a communications channel over which a digital signal is communicated and operates at a frequency that is a fraction of the bit rate of the digital signal. A feedback and/or equalizer circuit receives the output of the decision circuits and applies a feedback signal to the input of the decision circuits that is representative of a combination of the output signals of the decision circuits. The result of this exemplary embodiment is an improved noise margin which increases the capability of correctly interpreting signals communicated over a communications channel having a low-pass frequency characteristic. Because the feedback circuit does not operate at the full bit rate of the received signal, there is less circuit complexity and less demand placed on the receiver.

The operation of the above-described receiver for a multiphase communication link includes initially sampling a digital signal appearing at a point in a communications channel so as to generate a plurality of sampled signals. Next, the sampled signals are combined to form the feedback signal. Thereafter, the feedback signal is applied to the point in the communications channel to combine with signals transported over the communications channel.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE EXEMPLARY EMBODIMENTS OF THE INVENTION

The present invention will now be described more fully hereinafter with reference to the accompanying drawings in which exemplary embodiments of the invention are shown.

Figure 1:
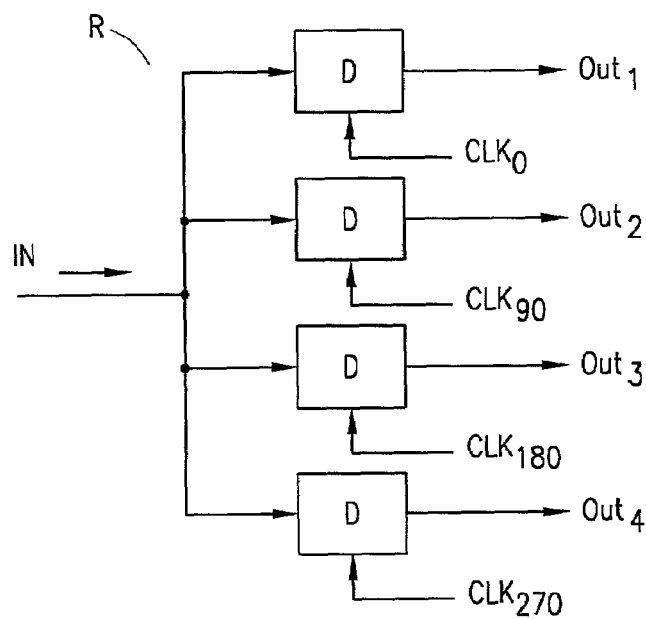
FIG. 1 is a block diagram of the front end of an existing multiphase receiver.
Figure 2:
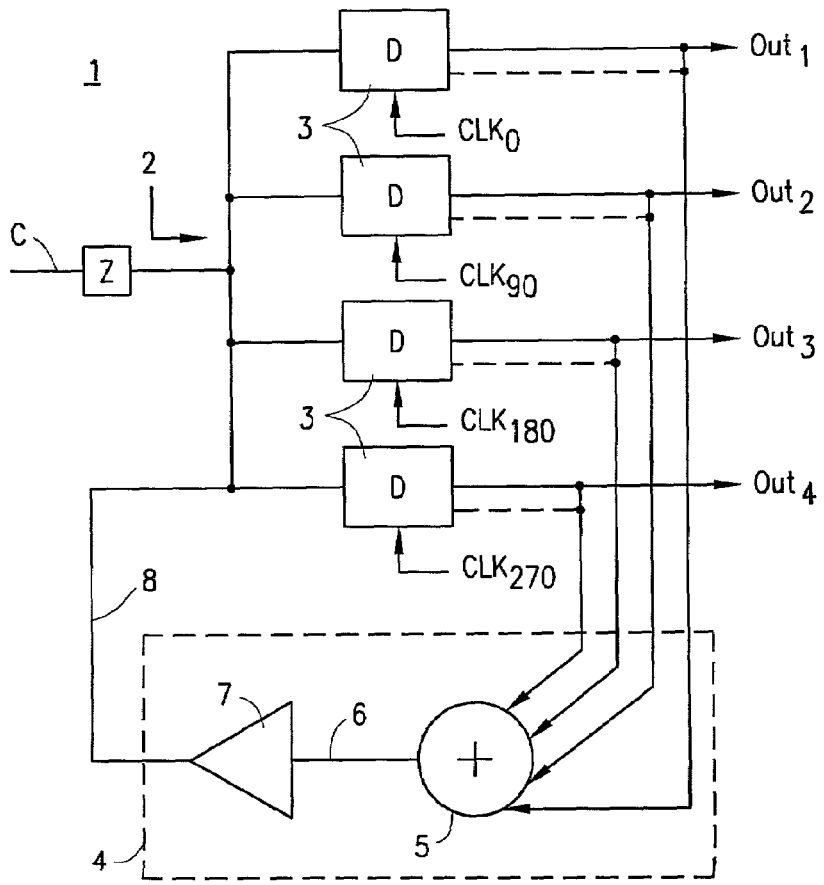
FIG. 2 is a block diagram of the front end of a multiphase receiver according to an exemplary embodiment of the present invention.

Referring to FIG. 2, there is shown the front end of a receiver 1 for a multiphase communications system. Receiver 1 includes an input 2 connected to a communications channel C over which digital signals are transported. Communications channel C is shown as including a channel source impedance Z associated therewith. Receiver 1 further includes a plurality of decision circuits 3. The input of each decision circuit 3 has an input that is coupled to the communications channel C. Each decision circuit 3 is adapted to determine or sample the state of its input signal at predetermined times, such as in response to a clock signal. Decision circuit 3 may be seen as a comparator circuit responsive to a clock signal so as to periodically determine the state of the input signal of the decision circuit 3.

Decision circuits 3 are individually clocked in receiver 1 so that each decision circuit 3 is clocked at equally spaced phases relative to each other. For a four-phase receiver 1 as shown in FIG. 2, the clock signals CLK applied to decision circuits 3 are 90 degrees out of phase with each other. For example, clock signal $CLK_0$ has no phase or zero degree phase, clock signal $CLK_{90}$ has a 90 degree phase shift relative to clock signal $CLK_0$, clock signal $CLK_{180}$ has a 90 (180) degree phase shift relative to clock signal $CLK_{90}$ ($CLK_0$), and clock signal $CLK_{270}$ has a 90 (270) degree phase shift relative to clock signal $CLK_{180}$, ($CLK_0$). Alternatively, each decision circuit 3 may operate off of different edges of a set or pair of clock signals.

In receiver 1, each decision circuit 3 determines the state of a signal appearing at receiver input 2 at a fraction of the input signal bit rate. For an N-phase receiver, decision circuits 3 operate at a frequency that is 1/N times the input signal bit rate. In the case of the four-phase receiver illustrated in FIG. 2, decision circuits 3 operate at ¼ of the input signal rate.

Receiver 1 is illustrated in FIG. 2 as a four-phase receiver having four decision circuits 3. It is understood, however, that a receiver in another embodiment of the present invention may include any number of decision circuits 3 greater than one, and be substantially any number of phases greater than one.

Receiver 1 further includes feedback and/or equalization circuitry 4 for generating a feedback signal and applying the feedback signal to the input of decision circuits 3 so as to provide equalization to receiver 1. Feedback circuitry 4 receives as input the output signal generated by each decision circuit 3 and generates the feedback signal therefrom. The use of equalization is seen to substantially prevent or reduce intersymbol interference in receiver 1 by improving the frequency response of communications channel C. In accordance with an exemplary embodiment of the present invention, feedback circuitry 4 determines the average of the output signals of all of the decision circuits 3 and applies the average signal to the input of decision circuits 3.

To this end, feedback circuitry 4 includes an adder circuit 5 (FIG. 2) which receives as an input the output signal of each decision circuit 3 and generates a summation signal 6 representative of the sum thereof. Because an average value is related to a summation value by a scale factor, summation signal 6 may be seen as also being representative of the average of the outputs of decision circuits 3. Adder circuit 5 is implemented to convert digital signals to analog signals and combine the analog signals on summation signal 6, as described in greater detail below. Alternatively, another embodiment of the present invention may include an adder circuit implemented as a digital adder that adds together digital signals generated by decision circuits 3 and generates a digital output signal.

Figure 3:
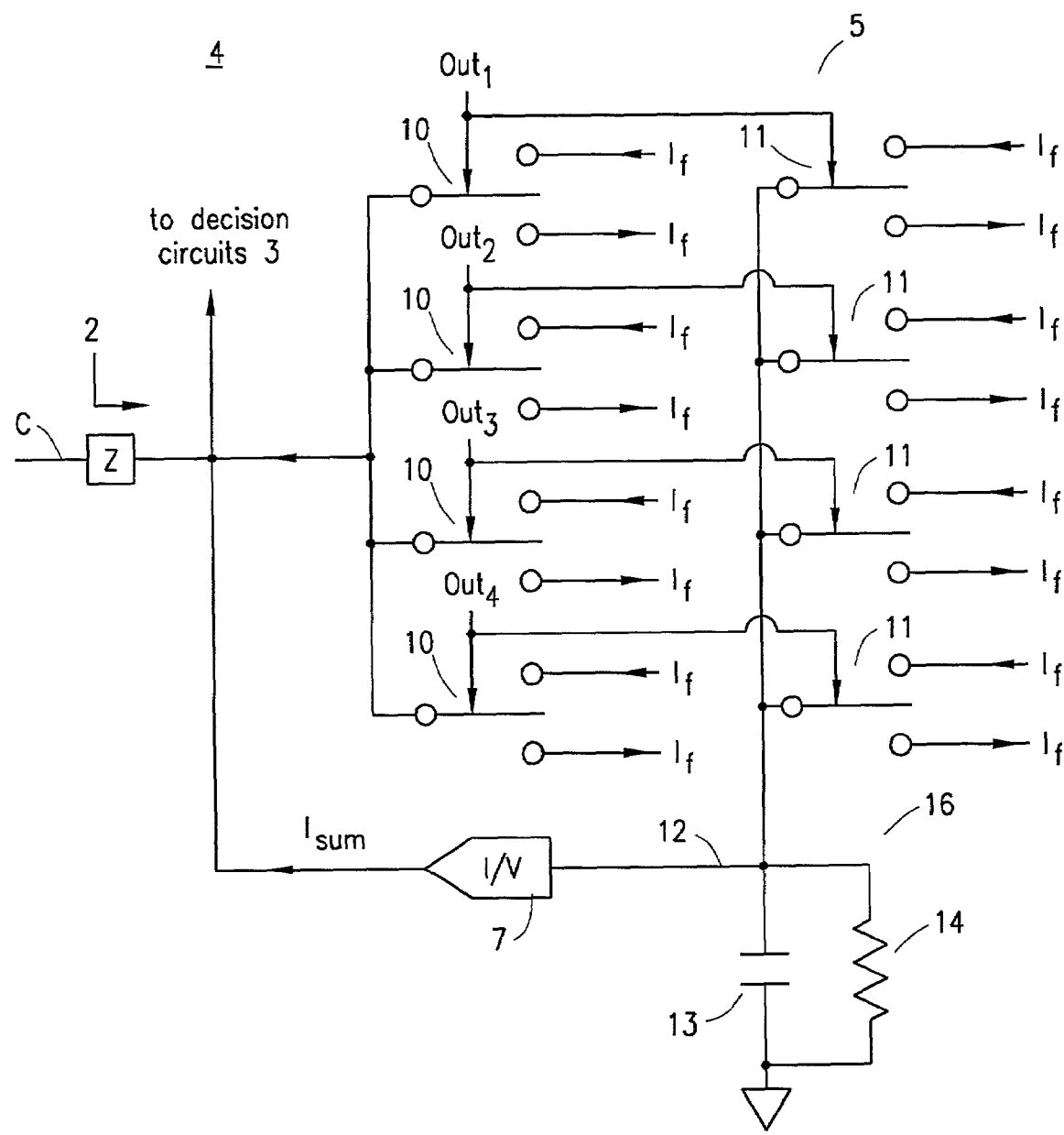
FIG. 3 is a circuit diagram of a portion of the multiphase receiver front end of FIG. 2.

The exemplary embodiment of the present invention shown in FIG. 2 shows each decision circuit 3 as having a single output port. In an alternative embodiment of the present invention, each decision circuit 3 has dual output ports, including a first output port that generates the output signal Out and a second output port that generates a signal that drives an input of feedback circuitry 4. FIG. 3 illustrates this alternative embodiment in dashed lines.

Feedback circuitry 4 further includes a conditioning circuit 7 which receives the output of adder circuit 5 and conditions the adder output so as to obtain a feedback signal 8 representative of the average of the output of the decision circuits 3. Conditioning circuit 7 scales the summation signal 6 and processes the frequency characteristics thereof. In addition, conditioning circuit 7 converts an electrical characteristic of summation signal 6, such as voltage, to a form, such as current, that is suitable for applying to input 2 of receiver 1. In the exemplary embodiment of the present invention, adder circuit 5 provides summation signal 6 as a voltage signal, and conditioning circuit 7 converts summation signal 6 into a current signal that is applied to receiver input 2 so as to create a voltage across the channel source impedance Z associated with receiver 1.

FIG. 3 illustrates an exemplary implementation of feedback circuitry 4. The implementation of feedback circuitry 4 provides compensation using multiple time scales. Feedback circuitry 4, and particularly adder circuit 5, includes a first set of switches 10. Each switch 10 is coupled to input 2 of receiver 1 so as to provide a current thereto. Each switch 10 switches between sourcing a current $I_f$ to input 2 and sinking a current $I_f$ therefrom, based upon the polarity of the control signal applied to the control terminal of switch 10. Switches 10 are coupled to current source and current sink circuitry (not shown) so as to selectively steer current relative to receiver input 2. The output of each decision circuit 3 is connected to and drives the control terminal of a distinct switch 10. As can be seen, currents provided by switches 10 are summed at input 2 of receiver 1 so as to modify the input signal appearing across channel source impedance Z. For receiver 1 having a four-phase equalization, the signal appearing across channel source impedance Z is modified at a time scale of four bits.

Feedback circuitry 4, and particularly adder circuit 5, further includes a second set of switches 11. Each switch 11 is coupled to summation node 12 and controlled so as to selectively provide a current thereto. Each switch 11 switches between sourcing a current $I_s$ to summation node 12 and sinking a current $I_s$ therefrom, based upon the polarity of the control signal applied to the control terminal of switch 11. Switches 11 are coupled to current source and current sink circuitry (not shown) so as to selectively steer current relative to summation node 12. The output of each decision circuit 3 is connected to and drives the control terminal of a distinct switch 11. As can be seen, currents provided by switches 11 are summed at summation node 12.

It is understood that each of switches 10 and 11 may be implemented as transistors and, particularly, as differential pairs of transistors for higher speed applications.

Adder circuit 5 further includes a charge collection device 16 coupled to summation node 12 for collecting the current provided by switches 11. The charge collection device 16 includes a capacitor 13 having a first plate coupled to summation node 12 and a second plate coupled to a reference voltage, such as the ground potential. The charge collection device 16 further includes a resistive element 14 connected in parallel relation with capacitor 13. The voltage level appearing across the charge collection device 16 is representative of the sum of the currents provided to summation node 12 by switches 11. The voltage appearing across the charge collection device varies with a time constant T that is based upon the capacitance of capacitor 13 and the resistance of resistive element 14.

Conditioning circuit 7 of feedback circuitry 4 is implemented as a transimpedance buffer circuit, having an input coupled to the charge collection device 16 and generating a current output signal $I_{sum}$ having a current level corresponding to the voltage appearing at the charge collection device 16. Current $I_{sum}$ modifies the signal appearing at the input 2 of receiver 1 by creating a voltage across channel source impedance Z. This modification occurs at a time scale that corresponds to the time constant T of the charge collection device. Time constant T is preferably larger than the bit time scale corresponding to the modification time for the first set of switches 10.

As shown in FIG. 3, feedback circuitry 4 is a two-time constant equalizer. A multiple time constant equalizer, such as the two-time constant equalizer of FIG. 3, more closely models channel frequency characteristics of communications channel C, such as dielectric losses and skin effect, than single time constant equalizer circuitry. As a result, feedback circuitry 4 provides substantially more precise compensation than single time constant equalization techniques.

It is understood that feedback circuitry 4 may include additional sets of switches, charge collection devices and transimpedance buffers so as to operate on more than two time scales (time constants).

Figure 4:
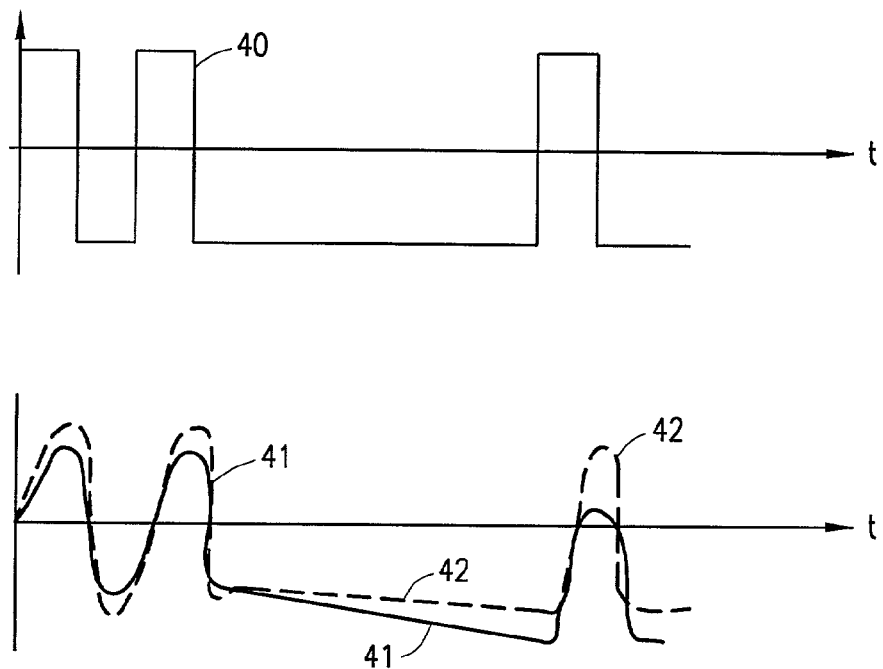
FIG. 4 is a waveform diagram illustrating the effect of the multiphase receiver front end of FIG. 2.

FIG. 4 illustrates the results obtained from multiphase communications receiver 1 according to an exemplary embodiment of the present invention. Waveform 40 represents the signal transmitted to receiver 1 over communications channel C. Waveform 41 represents the signal received at receiver 1 without any equalization. As can be seen, longer pulses or sequences encompassing several bits (time slices) creep or "soak" towards a larger magnitude. Short pulses following these prolonged pulses are seen to fail to rise sufficiently above the voltage level necessary to cause a decision circuit 3 to sample a logic high level and/or otherwise detect changes in the received signal. In other words, a receiver having no equalization has substantially reduced noise margin.

Waveform 42 of FIG. 4 represents the signal appearing at input 2 of receiver 1 of the exemplary embodiment of the present invention. The equalization utilized in receiver 1 is seen to substantially remove or reduce the "soaking" of long pulses, thereby allowing short pulses immediately following the long pulses to cause decision circuits 3 to correctly sample a logic high level with sufficient noise margin.

Figure 5:
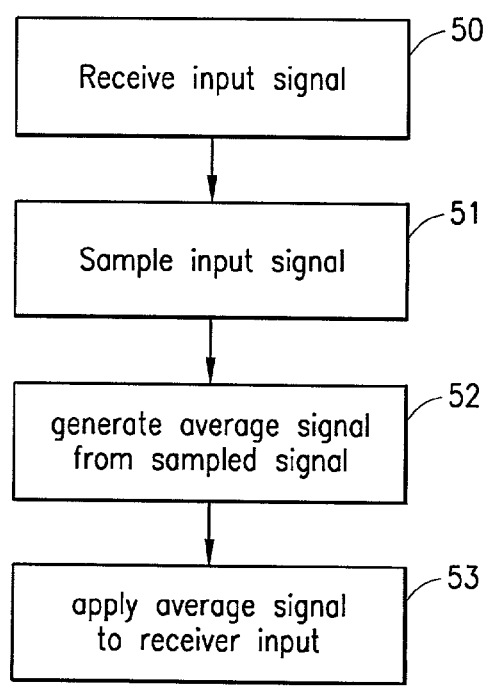
FIG. 5 is a flow chart illustrating an operation of the multiphase receiver front end of FIG. 2.

The operation of receiver 1 will be described with reference to FIG. 5. As a signal transmitted over communications channel C is received by receiver 1 at 50, the received signal is sampled at 51 by decision circuits 3 to generate a plurality of sampled signals. Decision circuits 3 sample the received signal in a staggered fashion, as described above. The sampled signals are added together to generate at 52 an averaged signal(s) representative of the average of the output of each decision circuit 3. The averaged signal(s) is generated by the feedback circuitry of FIG. 3 by selectively steering currents $I_f$ to receiver input 2 using switches 10 as controlled by the output of decision circuits 3; and by selectively steering currents $I_s$ to summation node 12 to create a collected voltage that is thereupon converted to a current $I_{sum}$. These generated currents are applied to receiver input 2 at 53 so as to modify the signal appearing thereat and thereby provide compensation to suitably improve the transfer characteristics associated with the transmission of signals to receiver 1.

Figure 6:
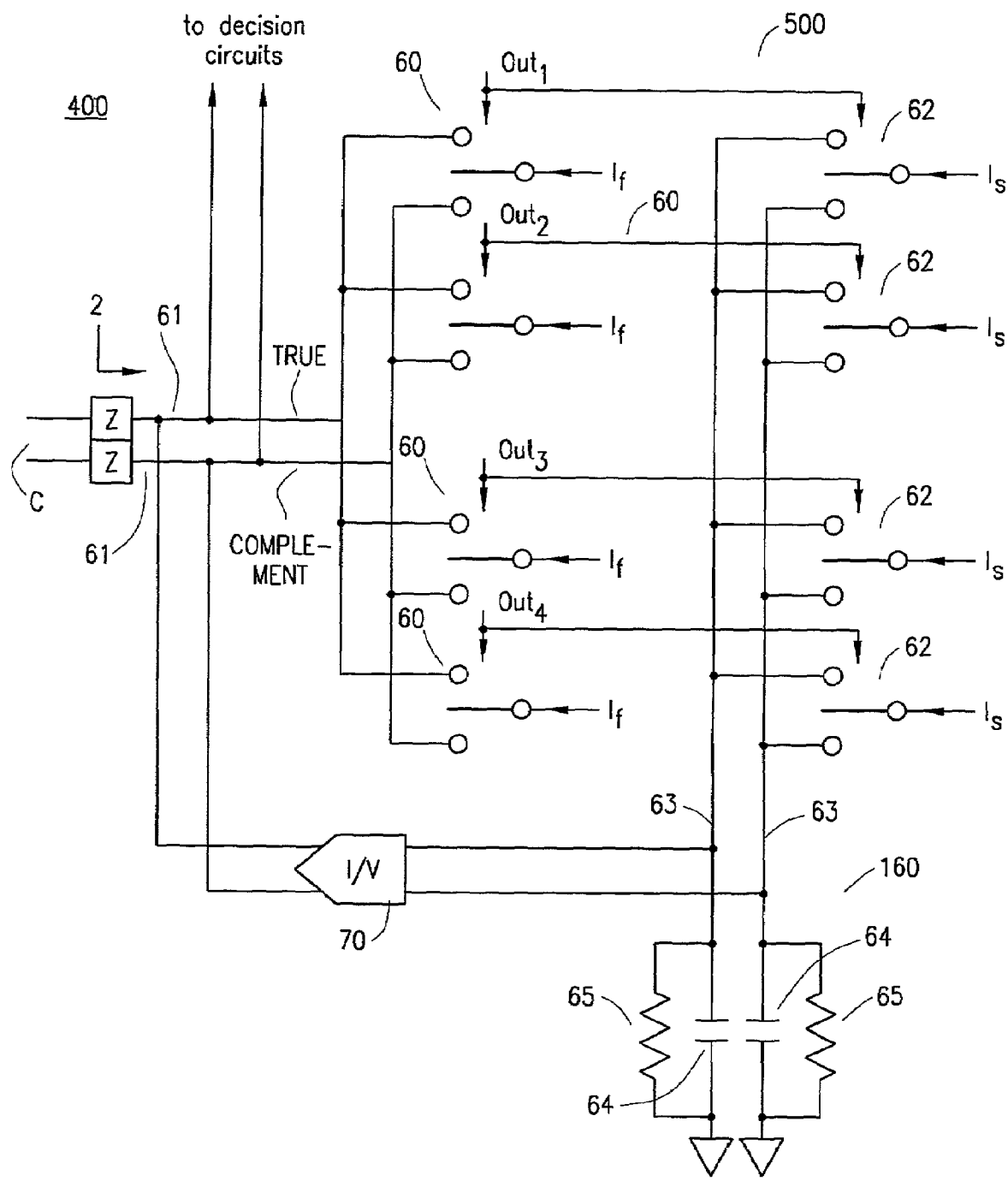
FIG. 6 is a circuit diagram of a portion of the multiphase receiver front end of FIG. 2 according to a differential input implementation of the present invention.

FIG. 6 illustrates another exemplary embodiment of a feedback circuitry 400 that replaces feedback circuitry 4 when receiver 1 is configured to receive a differential signal. Feedback circuitry 400 includes an adder circuit 500 and a conditioning circuit 70. Feedback circuitry 400 of FIG. 6, and particularly adder 500 thereof, includes a first set of switches 60. Each switch 60 is coupled to differential input 2 of receiver 1 so as to provide a current thereto. Each switch 60 selectively sources a current $I_f$ between the two differential lines 61 of differential input 2, based upon the polarity of the control signal applied to the control terminal of switch 60. Switches 60 are coupled to current source circuitry (not shown) so as to selectively steer current between the two differential lines 61 of differential input 2. Steering a current $I_f$ to one of the two differential lines 61 adds current to the differential input 2, while steering a current $I_f$ to the other of the two differential lines 61 subtracts current from the differential input 2. The output of each decision circuit 3 is connected to and drives the control terminal of a distinct switch 60. As can be seen, currents provided by switches 60 are summed at the differential lines of differential input 2 of receiver 1 so as to modify the differential signal appearing across channel impedances Z. For receiver 1 having a four-phase equalization, the signal appearing across channel source impedance Z is modified at a time scale of four bits.

Feedback circuitry 400, and particularly adder circuit 500, further includes a second set of switches 62. Each switch 62 is coupled to a differential pair of summation nodes 63 and controlled so as to selectively provide a current thereto. Each switch 62 switches a current $I_s$ to one of the summation nodes 63 based upon the polarity of the control signal applied to the control terminal of switch 62. Switches 62 are coupled to current source circuitry (not shown) so as to selectively steer current between any of the summation nodes 63. Steering a current $I_s$ to one of the summation nodes 63 adds current to the differential signal appearing across summation nodes 63, while steering a current $I_s$ to the other of the two summation nodes 63 subtracts current from the differential signal appearing across summation nodes 63. The output of each decision circuit 3 is connected to and drives the control terminal of a distinct switch 62.

The charge collection device 160 of feedback circuitry 400 of FIG. 6 includes a pair of capacitors 64, each of which has a first plate coupled to a distinct summation node 63 and a second plate coupled to a reference voltage, such as the ground potential. The charge collection 160 device further includes a pair of resistive elements 65, each of which is connected in parallel to a distinct capacitor 64. The voltage level appearing across the charge collection device 160 is representative of the sum of the currents provided to summation nodes 63 by switches 62. The voltage appearing across summation nodes 63 varies with a time constant T that is based upon the capacitance of capacitors 64 and the resistance of resistive elements 65.

Conditioning circuit 70 is a transimpedance buffer having a differential input connected to summation nodes 63 and adapted to generate differential output signal $I_{sum}$ having current levels corresponding to the voltage appearing across summation nodes 63. Differential output signal $I_{sum}$ modifies the differential input signal 2 of receiver 1 by creating a voltage across channel source impedances Z. This modification occurs at a time scale that corresponds to the time constant T discussed above. Time constant T is generally larger than the bit time scale corresponding to the modification time for the first set of switches 60.

It is understood that feedback circuitry 400 of FIG. 6 may include additional sets of switches, charge collection devices and/or transimpedance buffers so as to operate on more than two time scales. The operation of receiver 1 having feedback circuitry 400 of FIG. 6 is much the same as described above and illustrated in FIG. 5.

Although various embodiments of the method, system, and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the scope of the invention as set forth and defined by the following claims.

I claim:

1. A multiphase receiver for receiving a digital signal, comprising:
   a plurality of decision circuits, each decision circuit comprising a comparator circuit and having an input connected to a communications channel over which a digital signal is communicated, operating at a frequency that is a fraction of the bit rate of the digital signal and generating an output signal corresponding to the state of said digital signal; and
   feedback circuitry for receiving the output signal of two or more of the decision circuits and applying a feedback signal to the input of the decision circuits as a function of the output signals from the two or more of the decision circuits, wherein the function is the average of the output signals of the two or more decision circuits.

2. The multiphase receiver of claim 1, wherein:
   the function is a sum of the output signals of the two or more decision circuits.

3. The inultiphase receiver of claim 1, wherein the feedback circuitry comprises:
   an adder for receiving the output signal of the two or more of the decision circuits and generating a summation output; and
   a conditioning circuit for generating the feedback signal based upon the summation output of the adder, the feedback signal being suitable for modifying digital signals transported over the communications channel and appearing at the input of the decision circuits.

4. The multiphase receiver of claim 1, wherein the feedback circuitry receives the output signal from each of the decision circuits.

5. The multiphase receiver of claim 1, wherein the feedback circuitry comprises:
   a plurality of current steering switches, each current steering switch being driven by an output signal of a distinct decision circuit so as to pass a current therethrough based upon the value of the output signal of the corresponding decision circuit, each current steering switch being coupled to at least one summing node for combining the current thereof, the feedback signal being based upon an electrical characteristic of the summing node.

6. The multiphase receiver of claim 5, wherein the feedback circuitry further comprises:
   a charge collection component coupled to the at least one summing node so as to collect charges corresponding to the current passed by the current steering switches.

7. The multiphase receiver of claim 5, wherein:
   a direction of current passed by each current steering switch is based upon the value of the output signal of the decision circuit associated with the current steering switch.

8. The mnultiphitse receiver of claim 1, wherein the feedback circuitry comprises:
   a plurality of current steering switches, each current steering switch being driven by an output signal of a distinct decision circuit so as to pass a current therethrough based upon the value of the output signal of the corresponding decision circuit, each currant steering switch being combined at the input of the decisions circuits to form the feedback signal.

9. The multiphase receiver of claim 8, wherein:
   a direction of current passed by each current steering switch is based upon the value of the output signal of the descision circuit associated with the current steering switch.

10. The multiphase receiver of claim 1, wherein the feedback circuitry comprises:
    a plurality of current steering switches, each current steering switch being driven by an output signal of a distinct decision circuit so as to pass a current therethrough based upon the value of the output signal of the corresponding decision circuit, each current steering switch being coupled in a diffrential pair of summation nodes, the summation node of the differential pair of summation nodes to which a current is steered by a current steering switch is based upon the value of the output signal of the decision circuit associated with the current steering switch, the feedback signal being based upon an electrical characteristic of the differential pair of summation nodes.

11. A method for receiving digital signals, comprising:
    providing a plurality of comparator circuits each responsive to a different clock signal;
    sampling a digital signal appearing at an end point of a communications channel with the comparator circuits to generate a plurality of sampled signals; and
    applying a feedback signal to the end point of the communications channel, the feedback signal being based upon the sampled signals.

12. The method claim 11, further comprising:
    averaging the sampled signals and generating the feedback signal based upon the average of the sampled signals.

13. The method of claim 12, wherein the steps of averaging and generating comprise steering a plurality of currents relative to the end point of the communications channel, each current being based upon a distinct sampled signal.

14. The method of claim 13, wherein:
    the steering comprises steering a plurality of first currents relative to at least one summing node, each first current being based upon a distinct sampled signal; and
    the averaging and applying further comprise converting the signal appearing at the at least one summing node into a converted signal, and applying the converted signal to the end point of the communications channel.

15. The method of claim 14, wherein the direction of each first current is based upon a polarity of the sampled signal associated therewith.

16. The method of claim 14, wherein the averaging and applying further comprise:
    steering a plurality of second currents to the end point of the communications channel, each second current being based upon a distinct sampled signal.

17. The method of claim 11, wherein the feedback signal is a differential signal.

18. The method of claim 11, further comprising:
    summing the sampled signals and generating the feedback signal based upon the sum of the sampled signals.

19. A receiver for receiving digital signals, comprising:
    an input for receiving a digital signal having content;

a signal combiner for combining the digital signal with a feedback signal to provide an adjusted signal;

a plurality of decision circuits each comprising a comparator circuit, the comparator circuits each responsive to a different clock signal, the decision circuits providing decision signals corresponding to a state of said content, each of said decision circuits having an input for receiving the adjusted signal and providing a respective one of the decision signals; and feedback circuitry for providing the feedback signal as a function of the decision signals.

20. The receiver of claim 19, wherein the function is a sum of the decision signals.

21. The receiver of claim 19, wherein the function is an average of the decision signals.

22. The receiver of claim 19, wherein the feedback circuitry comprises:

an adder circuit tbr generating a summation signal based upon the decision signals; and a conditioning circuit for conditioning the summation signal, the feedback signal being the conditioned summation signal.

23. The receiver of claim 22, wherein:
the conditioning circuit converts the summation signal to a current.

24. The receiver of claim 22, wherein:
the conditioning circuit scales the summation signal.

25. The receiver of claim 19, wherein the feedback circuitry comprises;

a plurality of pairs of switches, each pair of switches being controlled by a distinct decision signal and including a first switch providing a current to the signal combiner and a second switch providing a current to at least one summation node; and a circuit fix applying to the signal combiner a signal representative of the signal appearing on the at least one summation nodes.

26. The receiver of claim 25, wherein:
a polarity of the current provided by each first switch is based upon the polarity of the decision signal controlling the first switch; and a polarity of the current provided by each second switch is based upon the polarity of the decision signal controlling the second switch.

27. The receiver of claim 25, wherein:
the at least one summation node comprises a pair of summation nodes, a voltage appearing across the pair of summation nodes comprising a differential signal; and each second switch provides a current to any of the summation nodes based upon the polarity of the decision signal controlling the second switch.

28. A receiver for receiving digital signals, comprising:
comparator means, in a non-feedback path of said receiver, for sampling a digital signal appearing at an end point of a communications channel so as to generate a plurality of sampled signals;

means for generating a feedback signal based upon the sampled signals, the means for generating comprising means for averaging the sampled signals and for generating the feedback signal based upon an average of the sampled signals; and means for applying the feedback signal to the end point of the communications channel.

29. The receiver of claim 28, wherein the means for averaging the sampled signals comprises:

means for steering a plurality of first currents relative to the end point of the communications channel, each current being based upon a distinct sampled signal.

30. The receiver of claim 29, wherein the means for averaging further comprises:

means for steering a plurality of second currents relative to at least one summing node, each second current being based upon a distinct sampled signal; and means for converting the signal appearing at the at least one summing node into a converted signal the converted signal forming the feedback signal.

31. The receiver of claim 30, wherein:
the direction of each second current is based upon a polarity of the sampled signal associated therewith; and the direction of each first current is based upon a polarity of the sampled signal associated therewith.

32. The receiver of claim 28, wherein:
the digital signal is a differential signal.

33. A multiphase receiver for receiving a digital signal, comprising:

a plurality of decision circuits, each decision circuit having an input connected to a communications channel over which a digital signal is communicated, operating at a frequency that is a fraction of the bit rate of the digital signal and generating an output signal corresponding to the digital signal; and feedback circuitry for receiving the output signal of two or more of the decision circuits and applying a feedback signal to the input of the decision circuits as a function of the output signals from the two or more of the decision circuits, the feedback circuitry comprises a plurality of current steering switches, each current steering switch being driven, by an output signal of a distinct decision circuit so as to pass a current therethrough based upon the value of the output signal of the corresponding decision circuit, each current steering switch being coupled to at least one summing node for combining the current thereof, the feedback signal being based upon an average electrical characteristic of the summing node.

34. A multiphase receiver for receiving a digital signal, comprising:

a plurality of decision circuits, each decision circuit having an input connected to a communications channel over which a digital signal is communicated, operating at a frequency that is a fraction of the bit rate of the digital signal and generating an output signal corresponding to the digital signal; and feedback circuitry for receiving the output signal of two or more of the decision circuits and applying an averaged feedback signal to the input of the decision circuits as a function of the output signals from the two or more of the decision circuits, the feedback circuitry comprises a plurality of current steering switches, each current steering switch being driven by an output signal of a distinct decision circuit so as to pass a current therethrough based upon the value of the output signal of the corresponding decision circuit, each current steering switch being combined at the input of the decisions circuits to form the average feedback signal.

35. A multiphase receiver for receiving a digital signal comprising:

a plurality of decision circuits, each decision circuit having an input connected to a communications channel over which a digital signal is communicated, operating at a frequency that is a fraction of the bit rate of the digital signal and generating an output signal corresponding to the digital signal; and feedback circuitry for receiving the output signal of two or more of the decision circuits and applying an averaged feedback signal to the input of the decision circuits as a function of the output signals from the two or more of the decision circuits, the feedback circuitry comprises a plurality of current steering switches, each current steering switch being driven by an output signal of a distinct decision circuit so as to pass a current therethrough based upon the value of the output signal of the corresponding decision circuit, each current steering switch being coupled to a differential pair of summation nodes, the summation node of the differential pair of summation nodes to which a current is steered by a current steering switch is based upon the value of the output signal of the decision circuit associated with the current steering switch, the averaged feedback signal being based upon an electrical characteristic of the differential pair of summation nodes.

* * * * *

UNITED STATES PATENT AND TRADEMARK OFFICE
CERTIFICATE OF CORRECTION

| | |
|---|---|
| PATENT NO. | : 7,206,341 B2 |
| APPLICATION NO. | : 10/021784 |
| DATED | : April 17, 2007 |
| INVENTOR(S) | : Steinbach |

It is certified that error appears in the above-identified patent and that said Letters Patent is hereby corrected as shown below:

In column 7, line 32, in Claim 3, delete "inultiphase" and insert -- multiphase --, therefor.

In column 7, line 66, in Claim 8, delete "mnultiphitse" and insert -- multiphase --, therefor.

In column 8, line 5, in Claim 8, delete "currant" and insert -- current --, therefor.

In column 8, line 11, in Claim 9, delete "descision" and insert -- decision --, therefor.

In column 8, line 20, in Claim 10, delete "in a diffrential" and insert -- to a differential --, therefor.

In column 8, line 37, in Claim 12, after "method" insert -- of --.

In column 9, line 18, in Claim 22, delete "tbr" and insert -- for --, therefor.

In column 9, line 29, in Claim 25, after "comprises" delete ";" and insert -- : --, therefor.

In column 9, line 35 (Approx.), in Claim 25, delete "fix" and insert -- for --, therefor.

In column 10, line 10, in Claim 30, after "signal" insert -- , --.

In column 10, line 33 (Approx.), in Claim 33, after "driven" delete ",".

In column 10, line 40 (Approx.), in Claim 33, delete "average" and insert -- averaged --, therefor.

UNITED STATES PATENT AND TRADEMARK OFFICE
CERTIFICATE OF CORRECTION

PATENT NO. : 7,206,341 B2
APPLICATION NO. : 10/021784
DATED : April 17, 2007
INVENTOR(S) : Steinbach It is certified that error appears in the above-identified patent and that said Letters Patent is hereby corrected as shown below:

In column 10, line 61, in Claim 34, delete "average" and insert -- averaged --, therefor.

In column 10, line 62, in Claim 35, after "signal" insert -- , --.

Signed and Sealed this

Twenty-eighth Day of August, 2007

JON W. DUDAS
*Director of the United States Patent and Trademark Office*